Sept. 5, 1961 C. A. GALLAGHER ET AL 2,999,152
HOT-BOX DETECTOR
Filed Oct. 28, 1958 3 Sheets-Sheet 1

INVENTORS
CORNELIUS A. GALLAGHER
WILLIAM M. PELINO
BY
Mitchell & Bechert
ATTORNEYS Sept. 5, 1961 C. A. GALLAGHER ET AL 2,999,152
HOT-BOX DETECTOR
Filed Oct. 28, 1958 3 Sheets-Sheet 2
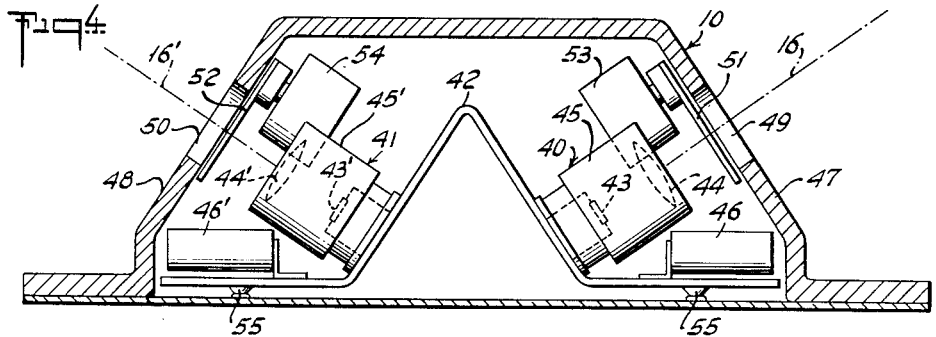
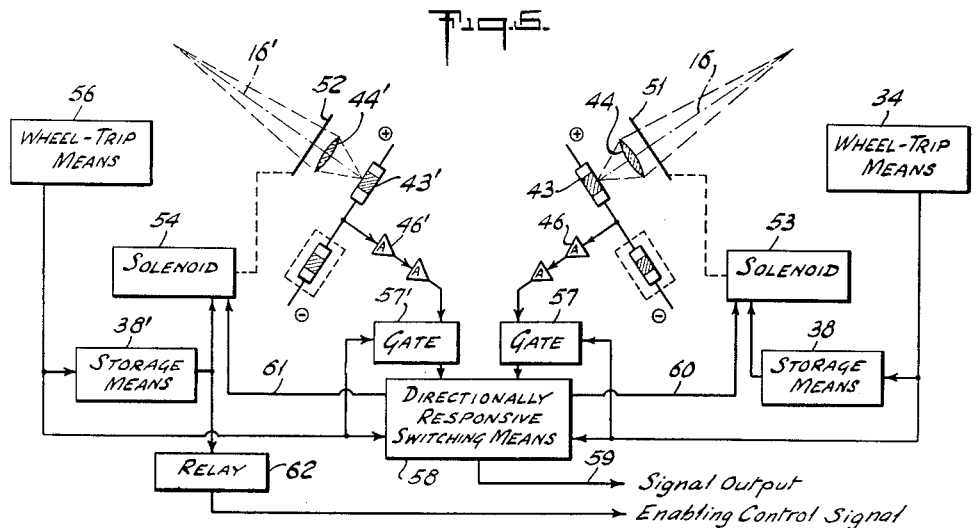
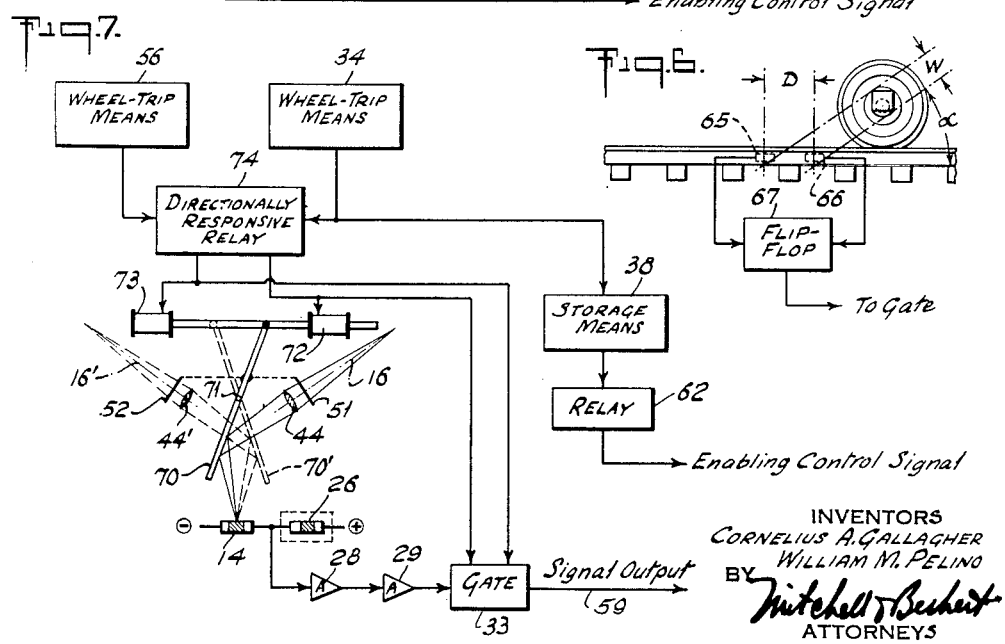
INVENTORS
CORNELIUS A. GALLAGHER
WILLIAM M. PELINO
BY
Mitchell Bechert
ATTORNEYS INVENTORS
CORNELIUS A. GALLAGHER
WILLIAM M. PELINO
BY
*Mitchell T Bechert*
ATTORNEYS

United States Patent Office 2,999,152
Patented Sept. 5, 1961

2,999,152
HOT-BOX DETECTOR
Cornelius A. Gallagher, Hicksville, and William M. Pelino, Garden City, N.Y., assignors to Servo Corporation of America, New Hyde Park, N.Y., a corporation of New York
Filed Oct. 28, 1958, Ser. No. 770,081
15 Claims. (Cl. 246—169)

Our invention relates to an improved hot-box detector of the variety which is mounted alongside a railway track and which automatically remotely responds to the passage of an overheated journal box. This application is a continuation-in-part of copending application Serial No. 620,703, filed November 6, 1956, now abandoned, and incorporates improvements over copending application Serial No. 506,125, filed May 5, 1955, now abandoned, in the name of Sabert N. Howell.

In hot-box detectors, as previously disclosed, heat-responsive cells have been imaged by appropriate optics so as constantly to observe the ends or covers of journal boxes of passing railroad cars. While such detectors provide an adequate aspect for the detection of certain relatively hot "hot-boxes" they are subject to disadvantages as, for example, the fact that the end of a journal box is usually a hinged lid and, as such, does not represent the warmest part of a journal box. Furthermore, any excessive heat development in the box is reflected at the end or cover only with the greatest time lag. Also, for any viewing aspect which involves general alignment with passing wheel axes, there is also alignment with brake shoes, which may be hot and which often are much hotter than a potentially dangerous hot-box; in addition, for the situation in which the journal-box lid may be missing, a direct axial viewing can develop a misleading signal. Thus, an axially directed or horizontal viewing aspect is subject to certain definite limitations.

It is, accordingly, an object of the invention to provide an improved hot-box detector construction not subject to the above-noted limitations.

It is another object to provide an improved hot-box detector construction in which the optical viewing aspect may be such as to image the heat-sensitive cell or detector on a lateral side, such as the forward (or leading) side, or the rear (or trailing) side of passing journal boxes, as distinguished from the axial ends of such boxes.

It is a specific object to provide a device which may be bi-directionally responsive to passing railroad traffic, that is, which may respond to detected hot-boxes, regardless of the direction of traffic on the section of track being monitored.

It is another specific object to provide certain gating mechanisms in combination with journal-boxes of the character indicated.

It is a still further specific object to provide a novel detector cell and circuit arrangement uniquely adapted for bi-directionally responsive detection of hot boxes on passing railroad traffic, regardless of the direction of traffic on the section of track being monitored.

Other objects and various further features of novelty and invention will be pointed out or will occur to those skilled in the art by a reading of the following specification in conjunction with the accompanying drawings. In said drawings, which show, for illustrative purposes only, preferred forms of the invention:

FIG. 4 is a sectional view through the housing of the detector of FIG. 1, showing the internal organization of optical parts in side elevation;

FIG. 5 is a diagram similar to FIG. 3, but illustrating application of the principles of FIG. 3 to a bi-directionally responsive detector;

FIG. 6 is a simplified diagram illustrating a special-purpose wheel trip for a particular use of the detector of FIG 3;

FIG. 7 is a diagram illustrating an alternative for the arrangement of FIG. 5;

Briefly stated, our invention contemplates an improved hot-box detector of the variety in which a heat-responsive cell or element is fixedly mounted alongside a section of track to be monitored. Optics continuously image the cell in the plane of passing journal boxes and on an axis inclined generally upwardly from beneath the passing boxes. The vertical plane which includes the viewing axis is preferably substantially parallel to the track, so that the viewing of brake shoes, steam-hose connections and the like can be avoided. Novel gating means are described, whereby assurance is had that the region of prime interest on each passing journal box will be monitored for deviation from normal temperature.

Figure 1:
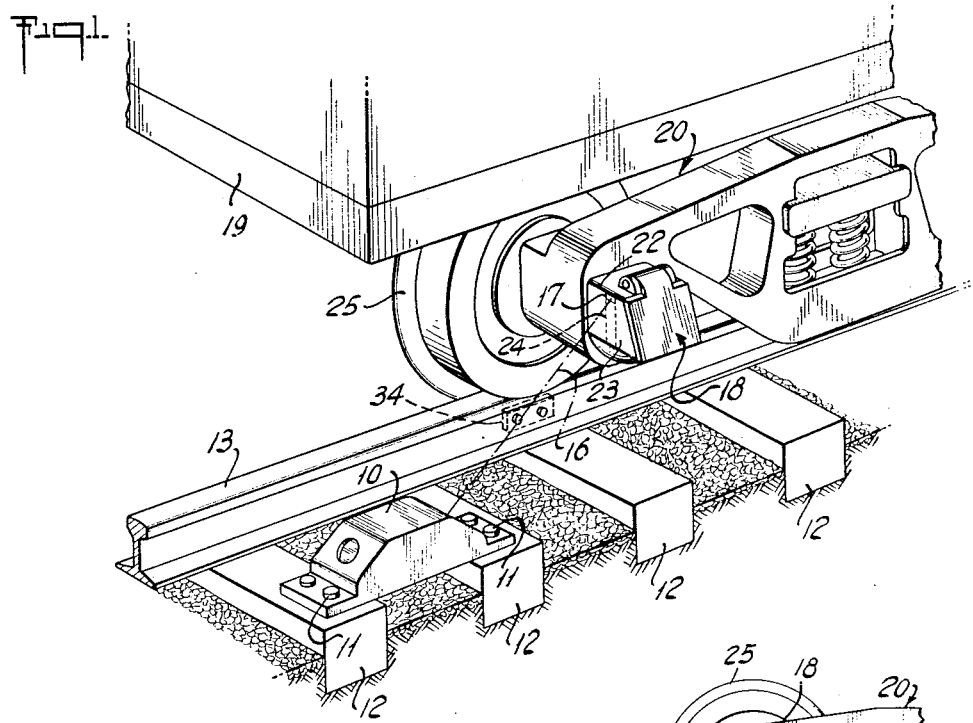
FIG. 1 is a fragmentary view in perspective showing a section of track to which our detector has been applied, showing the general geometry of the infrared optics with respect to the journal box of a piece of rolling stock.
Figure 2:
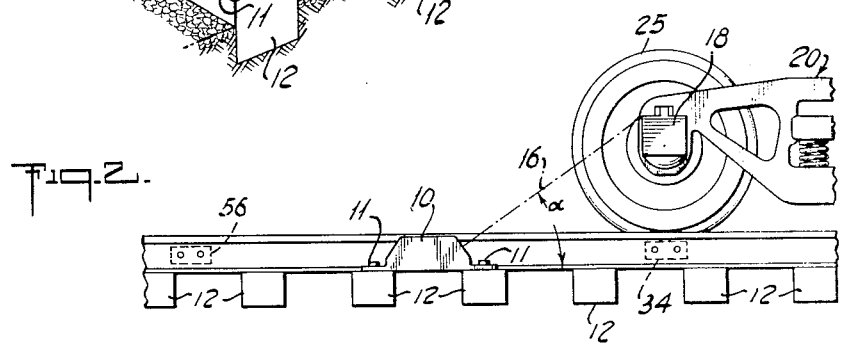
FIG. 2 is a view, on a reduced scale, showing a side or axial-end elevation of the arrangement of FIG. 1.
Figure 3:
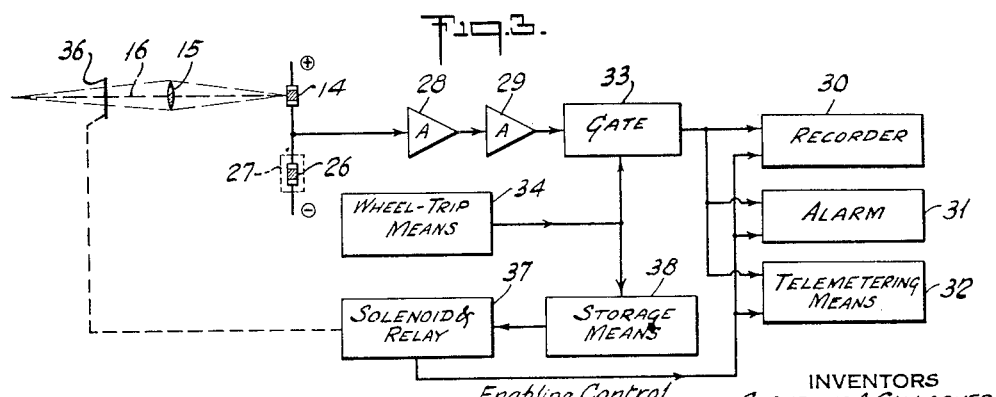
FIG. 3 is a diagram schematically depicting optical and electrical parts of the detector of FIG. 1.

Referring to FIGS. 1, 2 and 3 of the drawings, the invention is shown in application to a detector unit contained within a housing 10, permanently mounted as by means 11 securing the same to adjacent cross-ties 12, supporting a section of track 13. The housing 10 may contain a low-heat-responsive or far-infrared detector cell 14, such as a thermistor flake, and optics, such as an infrared-transmitting lens 15, imaging the cell 14 along an axis 16, as at the location 17, in the general horizontal plane of passing journal boxes 18. Usually, the detector 10 is provided in duplicate, for any single installation, there being a unit 10 on each side of the track to simultaneously monitor journal-box temperatures at both ends of the same axle.

Since hot-boxes are primarily a problem with freight cars, the rolling stock shown in FIG. 1 is a freight car having a main frame 19 overhanging the side frame 20 of one of its trucks, the journal box 18 forming an integral part of the truck structure 20. The viewing axis 16 in the embodiment illustrated in FIG. 2 slopes upwardly at an acute angle α, which is preferably of the order of 20 to 50 degrees with the horizontal, and is aligned to observe the part of the journal box body which projects outwardly of the side frame 20; we have obtained very satisfactory results when the viewing angle α was approximately 35 degrees in the vertical plane which paralleled the adjacent track 13.

It is to be noted that since the car frame 19 overhangs the journal box 18, the viewing thereof is such as to establish a more or less quiescent background level for the cell 14. In other words, except for the intervals between adjacent cars, the viewing axis 16 will either look directly at the underside of the car frame 19 or at a part of the journal box 18.

Thus, for this embodiment of forward-aspect viewing, that is, for a car 19 rolling in the direction toward the detector unit 10 (right to left in the sense of FIG. 1), the image 17 will first intercept the box 18 along the top edge 22 of the front lateral side 23. As the car proceeds further toward the detector 10, the image 17 scans down a path 24 on the front side 23 of the box 18, and for the box configuration shown, viewing on axis 16 will cover the whole side 23 and most of the bottom of the box 18. The important point to note about forward-aspect viewing (that is, viewing the oncoming or forward side of each journal box) is that the cell image 17 moves sharply from the relatively uniform and cool background level represented by the underside of the car 19 to the relatively warm upper edge 22 of the box 18. There is no gradual transition of temperature and, on the other hand, the gradient is virtually optimum, inasmuch as the upper part of a journal box is always the warmest part.

For trailing-aspect viewing, that is, for the situation in which the car 19 is traveling away from the detector 10 (left to right, in the sense of FIG. 1), the viewing axis 16 will first intercept the box 18 on its underside, which is always cool relative to the upper side. Thus, the transition from low background level on the underside of the car to the level on the bottom of the box 18 will not involve as great a change in temperature as for the forward-viewing aspect situation described above. For trailing aspect, however, the temperature profile along the scanned path 24 will be steadily rising as the image 17 rises up the side 23, and the hottest part of the box will be the last-viewed region.

Ordinarily, the cooling effect of onrushing air against the front side of a journal box, as compared with the relatively stagnant air on the rear or trailing side of a journal box, is sufficient to account for a considerable difference in measurable temperature between that at the top of the forward side of the box, as compared with that at the top of the trailing side of the journal box. Thus, it might be argued that best viewing is necessarily for a trailing aspect. This may all very well be true if the train is passing by at sufficient speed so that the detector cell 14 does not become insensitive. However, for slower speeds, system response is definitely degraded (because of low-frequency limitations) if temperature rise in the detector is not fast enough, even though the ultimate total temperature may be fairly substantial. The above discussion only serves to point out that forward-aspect viewing may be preferred over trailing-aspect viewing because the rate of change of measurable heat is greater, even though the maximum observable heat may not be of as great magnitude as that observable with rear-aspect viewing. However, from the standpoint of cleanliness of the lens, trailing-aspect viewing is better, since the air stream from passing trains tends to sweep dirt away from the lens.

Our improved detector is equally applicable to forward or to rear-aspect viewing, but for the case of FIG. 3, forward-aspect viewing will be assumed; thus, the car 19 and its wheel 25 will be assumed to be rolling toward the detector unit 10 so that the cell 14 will be subject to the sudden change in temperature which occurs when the image 17 is first intercepted by the upper part of the side 23 of the journal box. For the arrangement shown, the cell 14 is employed in a polarized bridge circuit in which a similiar cell element 26 is also connected; the element 26 is shielded, as suggested at 27, so as to provide an ambient or reference response against which the transient response of cell 14 may be compared. Bridge output passes first to a pre-amplifier 28 and then to a signal-amplifier 29 and, for certain applications, it is sufficient directly to utilize the heat-signal output of the amplifier 29, as by feeding the same to a recorder 30 and to alarm and telemetering means 31—32, as needed; alarm means 32 will be understood to function above a preset signal threshold level, representing a safety limit of journal-box temperature, as explained in said co-pending application. However, in the preferred form, we employ a gate 33 for the purpose of excluding all heat signals not attributable directly to response to the journal box 18.

The gate 33 may be triggered by a suitable wheel-trip, shown only in dotted outline 34 in FIGS. 1 and 2, but described in complete detail in copending application, Serial No. 627,330, filed December 10, 1956, in the name of Cornelius A. Gallagher, et al. now abandoned. For installations employing separate detectors 10 on opposite sides of the track, to monitor simultaneously both journal boxes on the same axle, it will be understood that the same trip 34 can serve both detectors 10. It suffices here to say that the trip 34 may be one of a number of varieties, and in said copending application the trip 34 comprises merely a magnetic circuit including a gap which is transiently closed by the flange of the wheel 25. A winding coupled to this magnetic circuit develops the trip signal. Preferebaly, the wheel-trip means includes a storage circuit as, for example, a monostable multivibrator or a time-delay drop-out relay, whereby the trip signal fed to the gate 33 for the purpose of opening the same is of a duration great enough to allow cell response at least to the top of side 23 of the journal box 18.

The location of the wheel-trip 34 with respect to the housing 10 should be such that the gate 33 will open just prior to imaging the cell at the top edge 22, regardless of the speed of the train. The length of time that gate 33 remains open should permit viewing of at least the upper part of the side 23, even for the slowest trains. For example, a gate interval of 50 milliseconds is found adequate even for trains passing at five miles an hour; such a gate interval is found to present no limitation on detector performance, even for the fastest freight trains.

In order to protect the internal parts of the housing 10 during periods when no trains are passing, we prefer to employ shutter means 36 to close and open a viewing aperture in the housing 10, the shutter means 36 remaining open as long as a train is passing the detector 10. The wheel-trip 34, in conjunction with a relatively long time-constant storage device 38, may provide the actuating signal for a shutter-opening solenoid 37. Thus, if the time-constant at 38 is long enough, such as five or six seconds for example, to maintain a shutter-opening signal to solenoid 37 for the slower speed trains, as for example, down to five miles an hour, the shutter 36 will also remain open for all greater train speeds. When the train passes completely, the storage device 38 will fail to excite solenoid 37 and the shutter 36 will close, as by spring or gravity-operated means, to await the next train.

An example of the time-constant control portion for the storage device would be a simple vacuum tube having plate, grid and cathode elements with a five megohm resistor and a two microfarad capacitor connected in parallel with each other, the parallel resistor-capacitor being in series with the grid.

The discussion thus far has concerned itself with the problem of detecting hot-boxes on trains coming always in the same direction down a given length of track being monitored by the detector 10. However, it is a feature of our invention that our detector is automatically responsive to monitor oncoming hot-boxes from a given aspect regardless of the direction of traffic along the track; for example, our detector incorporates automatic means for sensing the direction of oncoming traffic and for selecting the appropriate response aspect in accordance with the sensed direction of traffic. For such purposes, we illustrate in FIG. 4 the employement of a detector assembly 10, comprising optical systems having essentially duplicate or conjugate response axes 16—16', the axis 16 being as described in connection with FIGS. 1 and 2, and the axis 16' being the substantial reverse, i.e. looking in the opposite direction from the axis 16.

In the form shown in FIG. 4, duplicate detecting systems 40—41 are mounted on the same chassis 42. Each such system is shown to comprise a cell unit 43—43' and an infrared-transmitting lens 44—44', mounted in an adjustable focusing barrel 45—45'. Pre-amplifiers 46—46' may be mounted close to the cells 43—43', and the entire assembly is contained within a rugged housing having sloping side walls 47—48 to face oncoming traffic. Openings 49—50 in the walls 47—48 permit viewing on a selected one of the axes 16—16', when one of the shutters 51—52 has been actuated by its solenoid 53 or 54, as the case may be. The entire assembly of internal components may be shock-mounted, as suggested at 55.

For any particular desired viewing aspect, say, the forward-viewing aspect, it will be necessary to employ a first wheel trip, as at 34, to determine a first gate opening for trains approaching from the right (in the sense of FIG. 2), and a second similar wheel trip 56 on the other side of the detector 10 to determine a second gate opening for trains approaching from left to right, in the sense of FIG. 2. These same two wheel trips 34—56 also preferably serve to automatically determine the direction of approach of a particular passing train, for purposes of opening the correct shutter 51 or 52, as will be made clear from the discussion of FIG. 5.

In the arrangement of FIG. 5, the symbolism and functional components follow generally the scheme illustrated in FIG. 3, except that the system is automatically responsive regardless of the direction of oncoming traffic. Thus, the electrical components, up to and including separate gates 57—57' for the respective cells 43—43', correspond with those shown and described at 14—33 in connection with FIG. 3.

Now, for trains approaching from the right (in the sense of FIG. 2), and for the assumed case of forward-aspect viewing, the viewing axis 16 must be utilized to the exclusion of the viewing axis 16'. To automatically achieve this selection, we show directionally-responsive switching means 58 having inputs connected to both of the wheel-trip devices 34—56 and effective to directionally respond to the onset of the impulse received from the first wheel-trip device to be actuated. For the assumed case, such first impulse will be developed by the trip 34, which is thus effective to control the switching means 58, in the sense establishing connection of the output of gate 57 to a single signal-output line 59. Had the direction of approach been from left to right (in the sense of FIG. 2), trip 56 would have developed the first control impulse, and switching means 58 would have been switched to connect output of gate 57' to the signal output line 59, as will be understood.

An example of a directionally responsive switching means is simply a multicontact relay. Such devices, per se, are well known in the art.

Since switching means 58 must change its state in order to establish one or the other of the described connections to signal-output line 59, we use such change of state as a means for controlling operation of one of the shutter solenoids 53—54, as suggested by control connections 60—61. Thus, coincidentally with connecting gate 57 to output line 59, solenoid 53 is actuated to open the shutter 51, to the exclusion of shutter 52. The heat signals developed in output line 59 therefore correctly reflect only viewing on the axis 16, and it will be understood that for approach of traffic from the other direction, the heat signal (in line 59) will reflect viewing only on the axis 16', to the exclusion of the axis 16. Once a selected one of the shutter-opening solenoids has been operated, and assuming that the passing train is proceeding with sufficient speed, storage means 38 or 38', as the case may be, is effective to maintain the open-shutter connection as long as the train is passing.

The heat-signal present in line 59 may be fed to recorder, alarm, or telemetering means, as explained in connection with FIG. 3. The functioning of such devices need not be dependent upon the direction of passage of a train, and therefore a single relay 62, functioning, say, from the storage means 38', will suffice to develop a control signal for enabling or turning on the recorder, alarm, or telemetering means, only as long as the train is passing the box-temperature monitoring point.

The discussion above in connection with the circuits of FIGS. 3 and 5 has assumed the case of forward-aspect viewing on oncoming journal boxes. In such event, it has been explained that a constant relatively short-delay factor, or storage function, incorporated in the wheel-trip means 34 or 56, suffices to control the gate 33, 57, or 57'. This is because the detector responds best to relatively quick changes in heat, and for forward-aspect viewing, the greatest change will be observed when the image 17 first strikes the top or leading edge 22 of the journal box 18; it really matters not what the rest of the heat profile around the box may be, as long as this first strongly contrasting heat change is observed.

With trailing-aspect viewing, on the other hand, it is of greatest importance that the gate 33, 57, or 57', once opened, shall remain open long enough for the cell image 17 to scan all the way up to the top rear edge of the journal box. Naturally, the time required to achieve this will be different for different train speeds, and in FIG. 6 we show a modified trip device to meet the need for adequate response, regardless of train speed, particularly for trailing-aspect viewing. In the arrangement of FIG. 6, each wheel trip incorporates dual trip elements 65—66, each of which develops a separate control pulse determining the "on" and the "off" functioning of a flip-flop circuit 67. By setting the spacing D between trips 65—66 to correspond to the effective projected observable width W of a journal box, one can be sure that the signal output from the flip-flop circuit 67 is a square gating pulse effective to control the gate during the full period of exposure to the journal box. By inspection of the trigonometry of FIG. 6, the spacing D is preferably at least substantially the journal-box width W, divided by the sine of the elevation angle α of the viewing axis 16.

In the arrangement of FIG. 7, we provide for mechanical accomplishment of some of the functions described in greater detail in FIG. 5. Dual lens and shutter systems 44—44' and 51—52 may be employed but in connection with a single detector cell 14, thus obviating the need to switch heat outputs in accordance with the detected direction of approach of a train. In the form shown, a plane mirror 70 is pivoted at 71 and is positionable either as shown in full lines or as shown in dashed outline 70'. Solenoids 72—73 are in actuating relation with mirror 70 and they respond to directionally responsive relay means 74 in the manner described at 53—54—58 in FIG. 5. Thus, for forward-aspect viewing, and for a train approaching from right to left in the sense of FIG. 7, trip 34 will be actuated prior to trip 56, thereby causing relay 74 to actuate solenoid 72 and to move mirror 70 to the position shown in full outline, whereby shutter 51 is opened and cell 14 is caused to view on axis 16, via mirror 70; with a suitable delayed drop-out function for relay 74, this mechanical setting may be maintained for the full length of the passing train. For forward-aspect viewing of trains approaching in the opposite direction, relay 74 will be effective to set and hold mirror 70 in the position 70' and to open shutter 52, thus causing cell 14 to view on the axis 16' via mirror 70. For trailing-aspect viewing, the control function of relay 74 will be understood to be reversed from that described for forward-aspect viewing.

Figure 8:
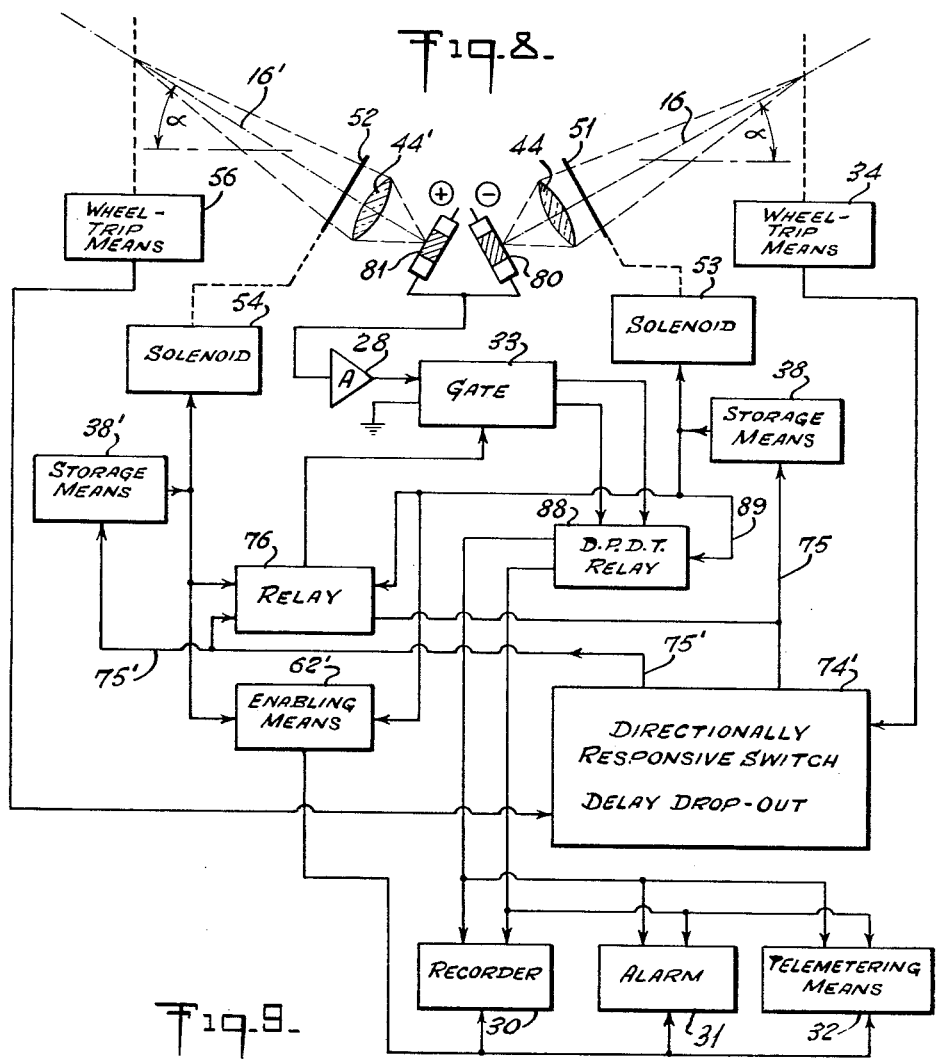
FIG. 8 is a diagram similar to FIGS. 3 and 5 but illustrating an alternative employment for a bi-directionally responsive detector.

In the form shown in FIG. 8, two separate detector cells 80—81, respectively, are aligned with the two oppositely inclined slant-aspect viewing axes 16—16', respectively, served by the optics 44—44' and by the shutter means 51—52, respectively. The two cells 80—81 are preferably matched and connected in the same bridge circuit, and they are oppositely polarized as indicated by polarity legends. The arrangement of the circuit is such that at any one time only one of the shutters 51 or 52 will be opened, thus assuring that one of the cells 80—81 will not be exposed to radiation while the other of these cells is exposed to radiation.

The common point of connection of the cells 80—81 is fed to the amplifier 28, constituting signal-processing means for the differential output of the cells 80—81. Use of the same bridge circuit 80—81 for selected viewing on the one to the exclusion of the other of the axes 16—16′ permits employment of the same signal-processing means 28—33 and recording or other display means 30—31—32, regardless of the direction of passing traffic, and the means whereby the direction of traffic is sensed is determined by the order in which the wheel trip 34 and its corresponding trip 56 are actuated; in other words, for traffic proceeding from left to right in the sense of the drawing, the wheel-trip means 56 will be first actuated, that is, before wheel-trip means 34, and the directionally responsive switch or relay 74′ will be actuated to channel subsequent trip signals into one or the other of the storage means 38—38′, depending upon the initially detected direction of traffic.

For example, for the assumed direction of traffic proceeding from left to right, the detection of a trip signal at 56 prior to a trip signal at 34 will cause the switch 74′ to subsequently channel into a line 75 (to storage means 38) only the trip signals developed thereafter by the trip means 34. This particular channeling assumes trailing-aspect viewing as discussed above. For this assumed direction of traffic and of viewing aspect, all subsequent trip signals developed by the means 56 will be ignored by the switch means 74′ so that no trip signal will be channeled into a line 75′ to storage means 38′.

The directionally responsive switch 74′ preferably incorporates a delayed drop-out feature having a sufficient time constant to accommodate the slowest train. Thus, once for a given train the switch 74′ has selected the channeling direction for subsequent trip pulses, the channel selection will hold for the full passage of the train. It will be noted that even if a train should come to rest on the hot-box detector and subsequently proceed in the same direction, the switch means 74′ will be effective to pick up and rechannel correctly for the same direction of traffic. Thus, when the slow-speed response limit has been exceeded, in other words, when the train has accelerated to, say, more than five miles per hour, the trip pulses will again be channeled only to the storage means 38.

As above noted, storage means 38 develops a holding signal for actuating the shutter solenoid 53 to assure viewing on the axis 16 as distinguished from the axis 16′. The storage means 38 is shown also supplying a steady signal to relay means 76, thereby rendering the relay means 76 directionally responsive to receive and transmit to the gate 33 only trip pulses sent by the line 75 from the wheel-trip means 34. Thus, as far as the video signal developed by bridge 80—81 is concerned, these recorder and other display means 30—31—32 will "see" only cell response to journal boxes and not to any other background "clutter."

The storage means 38 may provide a still further holding function as long as the train is proceeding fast enough (more than, say, 5 miles per hour) by actuating enabling means 62′ for the recorder and other display means 30—31—32. In other words, when a train first passes the detector 10 in a particular direction set by the switch 74′, the enabling means 62′ will "enable" or "turn on" the recording or other display means 30—31—32. In the case of a recorder 30, this may take the form of a switch to start a chart-drive motor, or in the case of telemetering means 32 it may take the form of turning on a carrier-signal generator, whereby the video output of the gate 33 may modulate said carrier for remote transmission of the journal-heat signals.

From the symmetry of the diagram of FIG. 8, it will be appreciated that for trains proceeding in the opposite direction, that is, from right to left in the sense of the diagram, and for trailing-aspect viewing, the other side of the system will be effective. For example, the trip means 34 will develop a pulse ahead of the trip means 56, so that the directionally-responsive switch 74′ will channel subsequent trip pulses into line 75′ to the exclusion of line 75. Storage means 38′ will then be effective to correctly channel the relay 76 (for response to trip 56) and to actuate the solenoid 54 for viewing on the axis 16′ to the exclusion of viewing on the axis 16. The enabling means 62′ will likewise be activated for the purposes described above.

Figure 9:
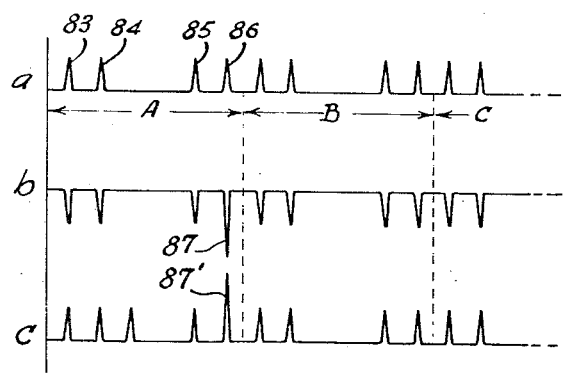
FIG. 9 is a diagram graphically depicting signal response when using the circuit of FIG. 8 for each of the opposed directions of passing traffic.

It will be appreciated that for the first assumed direction of passage of the train, namely, from left to right in the sense of FIG. 8, the polarity of pulses passing the gate 33 may be positive, as illustrated in curve A of FIG. 9 wherein two pairs of positive pulses are shown developed for each observed car, namely, the pulses 83—84 for the first two axles of the first truck of car A and pulses 85—86 for the last two axles, namely, for the axles of the second truck of car A. Pulse patterns for subsequent cars follow the same order as for car A and, of course, if no hot-box conditions exist, the pulses will be of generally uniform amplitude for the same type of bearings observed. In the assumed direction of passage, namely, from left to right and for rear-aspect viewing, the axis 16 will be employed for viewing, meaning that the shutter 51 is opened to the exclusion of shutter 52. This means that the cell 80 is the active cell and that cell 81 is the compensator or shielded cell.

For viewing trains proceeding in the opposite direction, namely, from right to left in the sense of FIG. 8, the axis 16′ will be the viewing axis to the exclusion of the axis 16. This means that shutter 52 will be opened and shutter 51 will be closed, so that the cell 81 is the active cell and cell 80 is the compensating or shielded cell. In such case, the amplifier 28, which is preferably a linear amplifier, will develop negative pulses of the character shown in curve B of FIG. 9, so that the recorder 30 would record journal-box temperature pulses of opposite polarity to those displayed in curve A for the opposite direction of passing traffic. By way of example, the fourth axle, depicted at 87 for the first car observed in curve B of FIG. 9, exhibits abnormally hot conditions illustrative of a hot box.

In accordance with the invention, correct pulse polarity is preserved regardless of the direction of traffic with the circuit of FIG. 8 by providing appropriate phase inversion of the signal, said phase inversion being activated or not activated, depending upon the sensed direction of traffic. For this purpose, we schematically indicate at 88 a double-pole double-throw relay effective to reverse the polarity of signals developed by gate 33, and a control line 89 for the relay 88 is shown activated by the storage means 38. In other words, whenever the solenoid 53 is operated, so is the relay 88 in a particular direction, thus determining a given polarity for signals sent to the recorder, alarm, and telemetering means 30—31—32. For traffic proceeding in the opposite direction, the storage means 38 will not be actuated, so that the relay 38 will assume its opposite condition, and phase inversion of the video signals will be effected so as to produce polarity inversion of the curve B of FIG. 9. The signals sent to the recorder, alarm, and telemetering means 30—31—32 will thus be of the same positive polarity as the curve A, all as shown in the curve C, in which the hot-box indication 87 is designated 87′ to illustrate its phase inversion.

It will be seen that we have described a relatively simple detector mechanism having improved means for discriminating troublesome hot-boxes. With our arrangement, the discrimination problem itself is in fact simplified, in that the background level is not cluttered with the numerous heat sources which have previously served only to mask the desired journal-box signals. Furthermore, our improved viewing aspect provide for greatest rate of change of observable journal-box signal, regardless of train speed, for virtually the entire range of train speeds. Also, our device lends itself to effective operation in the presence of bi-directional traffic on the same length of track.

While we have described our invention in detail for the preferred forms shown, it will be understood that modifications may be made within the scope of the invention as defined in the claims which follow.

What is claimed is:

1. In combination, a length of railroad track and hot-box detecting means fixedly mounted alongside a portion of said length of track, said detecting means including two separate heat-responsive cells on the same side of said length of track each of said cells producing an electrical signal in response to incident radiant energy, and optical means separately imaging said cells along separate axes each of which is inclined upwardly with respect to the track elevation and is directed generally in the longitudinal direction of the track, the respective inclines of said axes being directed in opposite directions, means to support shutters on said axes, separate shutters normally positioned on said imaging axes, means to selectively move each shutter out of alignment with said axes for protecting said optical means, two wheel operated trips mounted adjacent the track at longitudinally spaced locations to be actuated one after the other when a train wheel passes by, directionally-responsive relay means connected to both said trips and effective to develop a first output control for one of said shutters in response to a first order of successively tripping said wheel-trips, said directionally-responsive relay means being further effective to develop a second output control for the other of said shutters in response to the opposite order of successively tripping said wheel-trips, whereby the cell exposed through an open shutter may always reflect viewing on the same directional aspect with respect to a passing train, regardless of the direction of passage of a train.

2. The combination of claim 1, in which said relay means includes storage means having a time constant at least sufficient to keep a selected shutter continuously open for recurring wheel-trip impulses of a periodicity representing relatively slow passage of a train past the detector.

3. The combination of claim 2, in which the time constant of said storage means is of the order of 5 to 10 seconds, whereby speeds as slow as five miles per hour are accommodated.

4. The combination of claim 1, and including display means responsive to the output of an exposed cell, said relay means including means connecting the exposed cell to said display means, and an enabling control for said display means and responsive to an operation of a wheel-trip.

5. The combination of claim 4, in which said enabling control includes a storage circuit having a time constant adequate to maintain the display continuously enabled and thus continuously operative for wheel-trip signals of periodicity representing at least a relatively slow train.

6. In combination, a length of railroad track and hot-box detecting means fixedly mounted alongside a portion of said length of track, said detecting devices including a heat-responsive cell producing an electrical signal in response to incident radiant energy, and optical means imaging said cell along an axis inclined upwardly with respect to the track elevation and directed generally in the longitudinal direction of said track, said optical means including actuating means for selectively shifting the image of said cell along a second upwardly inclined axis directed generally in the opposite longitudinal direction of said first axis, two wheel-operated trips mounted at longitudinally spaced locations on the track and positioned to be actuated one after the other by a passing wheel, and directionally-responsive relay means connected to each of said trips and effective to develop a first output control in response to a first order of successively tripping said wheel-trips, said directionally-responsive relay means being further effective to develop a second output control in response to the opposite order of successively tripping said wheel-trips, said actuating means being operatively connected to said relay means and having a first image-axis positioning action responsive to said first output control and a second image-axis positioning action responsive to said second output control, whereby said cell may always reflect viewing on the same directional aspect with respect to a passing train, regardless of the direction of passage of a train.

7. The combination of claim 6, in which said actuating means for shifting said image includes a mirror as a part of said optical means, said mirror being positionable in two positions, each of which determines a separate one of said response axes.

8. In combination, a length of railroad track and a hot-box detecting device fixedly mounted alongside a portion of said length of track, said detecting device including heat-responsive cell means producing an electrical signal in response to incident radiant energy, and means for selectively imaging said cell means on a selected one of two oppositely diverging but upwardly inclined axes, said axes being inclined upwardly with respect to the track elevation and being directed generally in the longitudinal direction of said track, two wheel-operated trips mounted at spaced locations along the track and positioned to be actuated one after the other by a passing car wheel, the location of one of said trips being so related to the image developed on a first selected viewing axis that said one trip is actuated substantially only when a journal box for a wheel causing actuation of said first trip is in the imaged field of said cell means, said second wheel-trip being so positioned with respect to the second of said axes that said second trip is actuated substantially only when a journal box for a wheel causing actuation of said second trip is in the imaged field of said cell means, and directionally-responsive relay means connected to both said wheel-trips and in controlling relation with the selection of one or the other of said axes and selecting one to the exclusion of the other of said axes in response to a detected sequence of actuation of said wheel trips.

9. In combination, a length of railroad track and a hot-box detecting device fixedly mounted alongside a portion of said length of track, said detecting device including separate heat-responsive cells each producing an electrical signal in response to radiation incident thereon, and means for selectively imaging a selected one of said cells on a selected one of two oppositely diverging but upwardly inclined axes, said axes being inclined upwardly with respect to the track elevation and being directed generally in the longitudinal direction of said track, display means responsive to the video output of the selected cell, two wheel-operated trips mounted at spaced locations along the track and positioned to be actuated one after the other by a passing car wheel, the location of one of said trips being so related to the image developed on a first selected viewing axis that said one trip is actuated substantially only when a journal box for a wheel causing actuation of said first trip is in the imaged field of one of said cells, said second wheel-trip being so positioned with respect to the second of said axes that said second trip is actuated substantially only when a journal box for a wheel causing actuation of said second trip is in the imaged field of the other of said cells, gate means for the heat signal output of the selected cell and operated by the trip associated with the selected cell, and directionally-responsive relay means connected to both said wheel-trips and selectively controlling the connection of one to the exclusion of the other of said heat signal outputs to said display means in response to a detected sequence of actuation of said wheel trips.

10. A hot-box detector, comprising a detecting device adapted to be mounted alongside a length of railroad track, said detecting device including separate heat-responsive cells producing electrical outputs in response to incident radiant energy, and means for selectively imaging a selected one of said cells on a selected one of two oppositely diverging but upwardly inclined axes, said axes being inclined upwardly with respect to the track elevation and being directed generally in the longitudinal direction of said track, selectively operable shield means for shielding the unselected cell on the other of said upwardly inclined axes, means directionally responsive to the direction of a passing train and in controlling relation with said selectively operable imaging and shielding means, whereby for one detected direction of traffic flow one of said cells is exposed and the other is shielded, while for the opposite direction of traffic flow said other is exposed and said one is shielded, and signal-processing means connected for response to the differential output of said cells.

11. The combination of claim 10, and including selectively operable phase-inverting means connected to the differential output of said cells, said last-defined means including a control connection to said directionally responsive means, whereby for one direction of traffic flow the differential output of said cells will be of a first polarity, and whereby for the opposite direction of traffic flow said phase-inverting means will be operable to reverse the polarity of the differential output of said cells.

12. In combination, a length of railroad track and a hot-box detecting device fixedly mounted alongside a portion of said length of track, said detecting device including separate heat-responsive cells developing separate electrical outputs responsive to incident radiation, means for selectively exposing a selected one of said cells on a selected one of two oppositely diverging but upwardly inclined axes, said axes being inclined upwardly with respect to the track elevation and being generally in the longitudinal direction of said track, display means responsive to the video output of the selected cell, two wheel-operated trips mounted at spaced locations along the track and positioned to be actuated one after the other by a passing car wheel, the location of one of said trips being so related to the image developed on a first selected viewing axis that said one trip is actuated substantially only when a journal box for a wheel causing actuation of said first trip is in the imaged field of one of said cells, said second wheel-trip being so positioned with respect to the second of said axes that said second trip is actuated substantially only when a journal box for a wheel causing actuation of said second trip is in the imaged field of the other of said cells, signal-processing means including a differential connection to the outputs of said cells, said signal-processing means further including a gate for the differential heat-signal output and operated by the trip associated with the cell selected for exposure to journal boxes, and directionally responsive relay means connected to both said wheel trips and selectively controlling exposure of one to the exclusion of the other of said cells in response to a detected sequence of actuation of said wheel trips.

13. The combination of claim 12, in which said cells are thermistor bolometers connected in opposite arms of the same bridge circuit.

14. The method of determining infrared radiation above a predetermined value for railroad journal boxes passing a fixed observation location and regardless of the direction of traffic flow along a particular length of track at said location, which comprises determining the instantaneous direction of traffic flow, utilizing the direction determination to apply a radiation image of corresponding rear portions of passing journal boxes to an infrared detector, and utilizing the signal generated by said detector for indicating that the radiation level of one or more of the observed journal boxes is above said predetermined value.

15. The method of determining infrared radiation above a predetermined value for railroad journal boxes passing a fixed observation location and regardless of the direction of traffic flow along a particular length of track at a said location, which comprises determining the instantaneous direction of traffic flow, utilizing the direction determination to apply a radiation image of corresponding forward portions of passing journal boxes to an infrared detector, and utilizing the signal generated by said detector for indicating that the radiation level of one or more of the observed journal boxes is above said predetermined value.

References Cited in the file of this patent

UNITED STATES PATENTS

| | | |
|---|---|---|
| 1,046,794 | Jennings | Dec. 10, 1912 |
| 1,064,673 | Steevens | June 10, 1913 |
| 1,182,100 | Nachod | May 9, 1916 |
| 2,818,508 | Johanson et al. | Dec. 31, 1957 |
| 2,856,539 | Orthuber et al. | Oct. 14, 1958 |